United States Patent
Neethiraj et al.

(10) Patent No.: US 8,935,669 B2
(45) Date of Patent: Jan. 13, 2015

(54) STRATEGIES FOR PERFORMING TESTING IN A MULTI-USER ENVIRONMENT

(75) Inventors: Madhanmohan Neethiraj, Sammamish, WA (US); Costin Hagiu, Sammamish, WA (US); Vishal D. Maru, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1634 days.

(21) Appl. No.: 11/733,872

(22) Filed: Apr. 11, 2007

(65) Prior Publication Data

US 2008/0256389 A1    Oct. 16, 2008

(51) Int. Cl.
G06F 9/44   (2006.01)
G06F 11/22  (2006.01)

(52) U.S. Cl.
CPC ................................. G06F 11/2294 (2013.01)
USPC ....................................................... 717/124

(58) Field of Classification Search
None
See application file for complete search history.

(56) References Cited

U.S. PATENT DOCUMENTS

| | | | |
|---|---|---|---|
| 5,233,611 A | 8/1993 | Triantafyllos et al. | |
| 6,014,760 A * | 1/2000 | Silva et al. | 714/46 |
| 6,035,404 A | 3/2000 | Zhao | |
| 6,601,020 B1 * | 7/2003 | Myers | 702/186 |
| 6,801,940 B1 | 10/2004 | Moran et al. | |
| 6,816,455 B2 | 11/2004 | Goldberg et al. | |
| 6,934,934 B1 * | 8/2005 | Osborne et al. | 717/126 |
| 6,938,085 B1 | 8/2005 | Belkin et al. | |
| 6,970,924 B1 * | 11/2005 | Chu et al. | 709/224 |
| 7,035,771 B2 | 4/2006 | Butt et al. | |
| 7,165,240 B2 * | 1/2007 | Patterson | 717/116 |
| 7,272,835 B2 * | 9/2007 | Patterson | 719/316 |
| 7,499,865 B2 * | 3/2009 | Aggarwal et al. | 705/7.11 |
| 2002/0138226 A1 * | 9/2002 | Doane | 702/119 |
| 2003/0074407 A1 * | 4/2003 | Zhang et al. | 709/205 |
| 2003/0074606 A1 * | 4/2003 | Boker | 714/42 |
| 2003/0182408 A1 | 9/2003 | Hu | |
| 2004/0138847 A1 | 7/2004 | Lebee et al. | |
| 2006/0129992 A1 * | 6/2006 | Oberholtzer et al. | 717/124 |
| 2006/0200469 A1 | 9/2006 | Chidambaran et al. | |

OTHER PUBLICATIONS

Ballocca, et al., "Benchmarking a Site with Realistic Workload," accessible at <<https://www.di.unito.it/~ruffo/bio/papers/wwc02.pdf>>, 2002 IEEE International Workshop on Workload Characterization, Nov. 25, 2002, pp. 14-22.

Sidat, "Automated Stress Testing of Web Applications using User Session Data," accessible at <<http://scholar.google.com/scholar?hl=en&lr=&q=cache:6ubCasaR46oJ:www.dcs.kcl.ac.uk/staff/mark/PastMScProjects2004/MohamedSidat.doc+Automated+Stress+Testing+of+Web+Applications+using+User+Session+Data>>, MSc Project Report, King's College London, Sep. 2, 2005, pp. 1-39.

* cited by examiner

Primary Examiner — Lewis A Bullock, Jr.
Assistant Examiner — Christine Dang
(74) Attorney, Agent, or Firm — Kate Drakos; Micky Minhas; Lee & Hayes, PLLC

(57) ABSTRACT

A strategy is described in which multiple testing agents perform multiple respective tests in a multi-user environment. One such multi-user environment allows multiple clients to interact with remote applications that are executed on a server. According to one exemplary case, a central test management module coordinates the execution of the multiple tests by the testing agents. For instance, the test management module can prevent testing agents that make demands on a global state of the multi-user environment from interfering with other testing agents.

20 Claims, 6 Drawing Sheets

STRATEGIES FOR PERFORMING TESTING IN A MULTI-USER ENVIRONMENT

BACKGROUND

A multi-user environment allows multiple clients to interact with applications executed on a remote server. Users operating the clients receive generally the same user experience as if the applications were executed locally by the clients. One type of multi-user environment is Terminal Services, which uses the Remote Desktop Protocol (RDP). Terminal Services is produced by Microsoft Corporation of Redmond, Wash.

It is desirable to test any software product prior to commercial release. The same is true with products that operate in a multi-user environment. However, various challenges may arise when performing tests in a multi-user environment. For instance, as appreciated by the present inventors, one or more tests may affect the global state of the multi-user environment, raising the possibility that one test may interfere with another.

One approach to testing in a multi-user environment is to provide a single custom-designed monolithic test application that performs a collection of tests. However, this approach is basically ad hoc in nature, requiring the developer to painstakingly work out the interaction among the multiple tests within the application. This characteristic of the approach makes it difficult to add new tests to the application or otherwise modify the application. In other words, this solution does not scale well to the evolving needs of a test community.

There is accordingly a need for more effective solutions for performing tests in a multi-user environment.

SUMMARY

A strategy is described in which multiple testing agents perform multiple respective tests in a multi-user environment. One such multi-user environment allows multiple clients to interact with remote applications that are executed on a server. Each test can examine the reliability of one or more features of the multi-user environment. For instance, one or more tests can constitute stress-type tests.

According to one exemplary case, a central test management module coordinates the execution of the multiple tests by the testing agents. For instance, the test management module can define a pool of available connections. The test management module can grant connections to the testing agents from this pool of available connections. The testing agents can release the connections when no longer needed. In one exemplary case, the test management module can prevent testing agents that make demands on a global state of the multi-user environment from interfering with other testing agents.

According to one exemplary case, the strategy provides a test definition system for defining individual tests. The test definition system defines a test based on a combination of: a base test module; an environment-related module; and a test-specific module. The base test module and the environment-related module include general set-up information that pertains to multiple different tests. The test-specific module includes information that pertains to a specific individual test.

According to one exemplary case, the strategy uses a single computing machine to implement the testing agents and the test management module. In another exemplary case, the strategy uses at least a first machine to implement the testing agents and a second machine to implement the test management module.

The strategy confers a number of benefits. According to one exemplary benefit, the strategy provides a well-coordinated way to run multiple tests in a multi-user environment. According to another exemplary benefit, the strategy provides a scaleable and efficient framework for developing and adding new tests and modifying existing tests. For instance, a developer of a new test need not create ad hoc rules which specify how the test is to integrate with a suite of pre-existing tests, as the central test management module handles this task. In this manner, the strategy provides a mechanism that allows developers to independently create new tests; at the same time, the strategy ensures that the tests work well together.

Additional exemplary implementations and attendant benefits are described in the following.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for performing tests in a multi-user environment. The strategy can be manifested in various systems, apparatuses, modules, procedures, storage mediums, data structures, and other forms.

This disclosure includes the following sections. Section A describes an exemplary system for performing tests in a multi-user environment. Section B describes exemplary procedures that explain the operation of the system of Section A. Section C describes exemplary processing functionality that can be used to implement any aspect of the system of Section A.

A. Exemplary System

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component." "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A.1. System Overview

Figure 1:
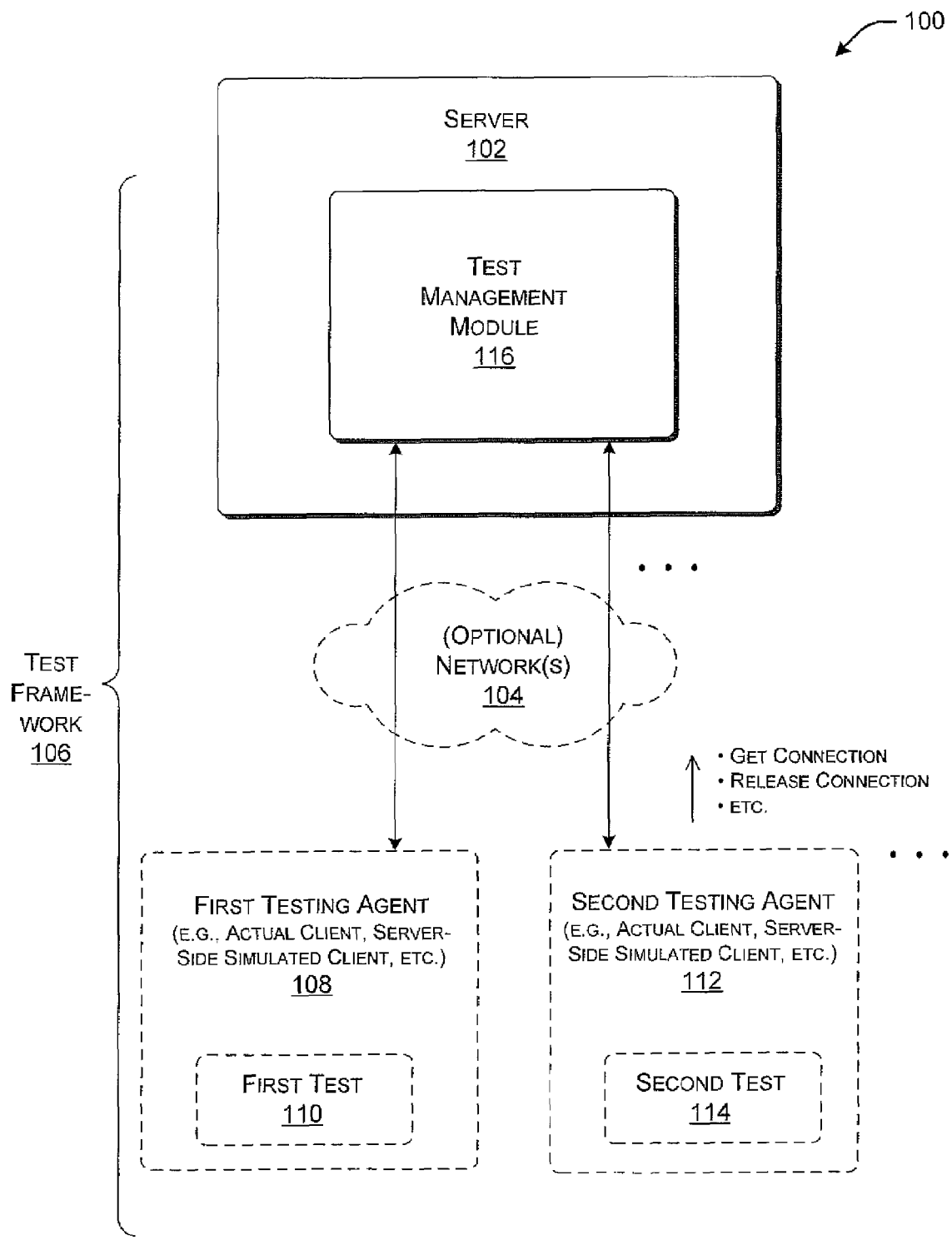
FIG. 1 shows an exemplary system associated with a multi-user environment.

FIG. 1 shows one exemplary system 100 that can be used to implement the principles set forth herein. The system 100 operates in a multi-user environment. A multi-user environment refers to any setting in which multiple users can interact with shared application resources. For example, in one case, the system 100 can use a server 102 (or other type of processing machine) to implement various applications. The system 100 can allow users to access the application(s) via one or more clients.

One example of a multi-user environment is Terminal Services functionality provided by Microsoft Corporation of Redmond, Wash. In this technology, one or more terminal services (TS) clients can interact with one or more applications executed by a TS server. Terminal Services technology uses the Remote Desktop Protocol (RDP) to govern the interaction between the TS clients and the TS server. The principles described herein can be implemented using Terminal Services technology, but can also be implemented using other types of multi-user systems.

A multi-user environment is characterized by various features. According to one feature, the multi-user environment allows multiple users to interact with shared resources in multiple respective user sessions. In operation, a user first establishes a connection with the server 102, upon which the server 102 may present the user with a conventional logon type screen. The user can enter credential information via the logon type screen. In response, the server 102 can authenticate the user and establish a user session. The user can interact with an application being executed on the server 102 through the user session.

According to another feature, the user's input is redirected to the server 102 as if the user were inputting information directly to the server 102. The output of application being run on the server 102 can also be redirected to the user at the client. Further, using a feature referred to as device redirection, the application being run on the server 102 can optionally utilize the devices that are locally implemented by the client. For instance, assume that the user is interacting with a word processing program being run on the server 102. Using the device redirection feature, the user can instruct the application to retrieve documents from the client's local storage drive and to store documents to this drive.

The multi-user environment can include yet additional features that define its behavior.

FIG. 1 includes a test framework 106 for applying a collection of tests to examine various features of the multi-user environment. For example, the tests can examine the connection-forming behavior of the multi-user environment, the logon/logoff behavior of the multi-user environment, the redirection behavior of the multi-user environment, and so forth. The tests can also examine features associated with various remote applications with which the users may interact.

In one case, the tests can examine the reliability of the features. This type of test can take the form of a so-called stress test. One type of stress test can repeatedly perform an action which invokes a feature of the multi-user environment. For example, one test can operate by repeatedly forming and releasing connections. Another test can operate by repeatedly performing logon and logoff operations, and so on. The aim of these types of tests may be to explore race conditions in the multi-user environment.

The test framework 106 includes two basic parts. The first part comprises a plurality of testing agents. The testing agents refer to any functionality which carries out individual respective tests. For example, FIG. 1 shows a first testing agent 108 which carries out a first test 110, and a second testing agent 112 that carries out a second test 114, and so on. (Only two testing agents are shown to facilitate discussion; but it will be appreciated that the system 100 can include any number of testing agents.)

The second part comprises test management module 116. The purpose of the test management module 116 is to coordinate the tests being performed by the testing agents (108, 112, . . . ). That is, the test management module 116 acts as a central broker for the different tests being performed by the testing agents (108, 112, . . . ). As will be described in greater detail below, the testing agents (108, 112, . . . ) will make various requests to the test management module 116. The test management module 116 will grant or deny the requests based on various criteria.

The testing framework 106 can be physically implemented in various ways. In one implementation, all parts of the test framework 106 can be implemented by a single computing machine. For example, the server 102 that is being tested can also include machine-readable code that implements both the testing agents (108, 112, . . . ) and the test management module 116. In this context, the testing agents (108, 112, . . . ) function as simulated clients. In another implementation, at least a first computing machine can be used to implement the testing agents (108, 112, . . . ) and a second computing machine can be used to implement the test management module 116. For example, a single client can be used to implement all of the testing agents (108, 112, . . . ), while the server 102 that is being tested can be used to implement the test management module 116. In yet another implementation, one or more computing machines that are independent of the multi-user environment that is being tested can be used to implement one or more parts of the test framework 106. For example, a special-purpose test computer can be used to implement the test management module 116 (as opposed to the server 102). In this case, the test computer can interact with the components of the multi-user environment that it is testing.

Still further implementations are possible. The remaining discussion takes an agnostic approach as to the issue of what components implement different aspects of the test framework 106. It should be understood that any aspect of the test framework 106 can be implemented by various components within the system 100.

A.2. Exemplary Test Framework

Figure 2:
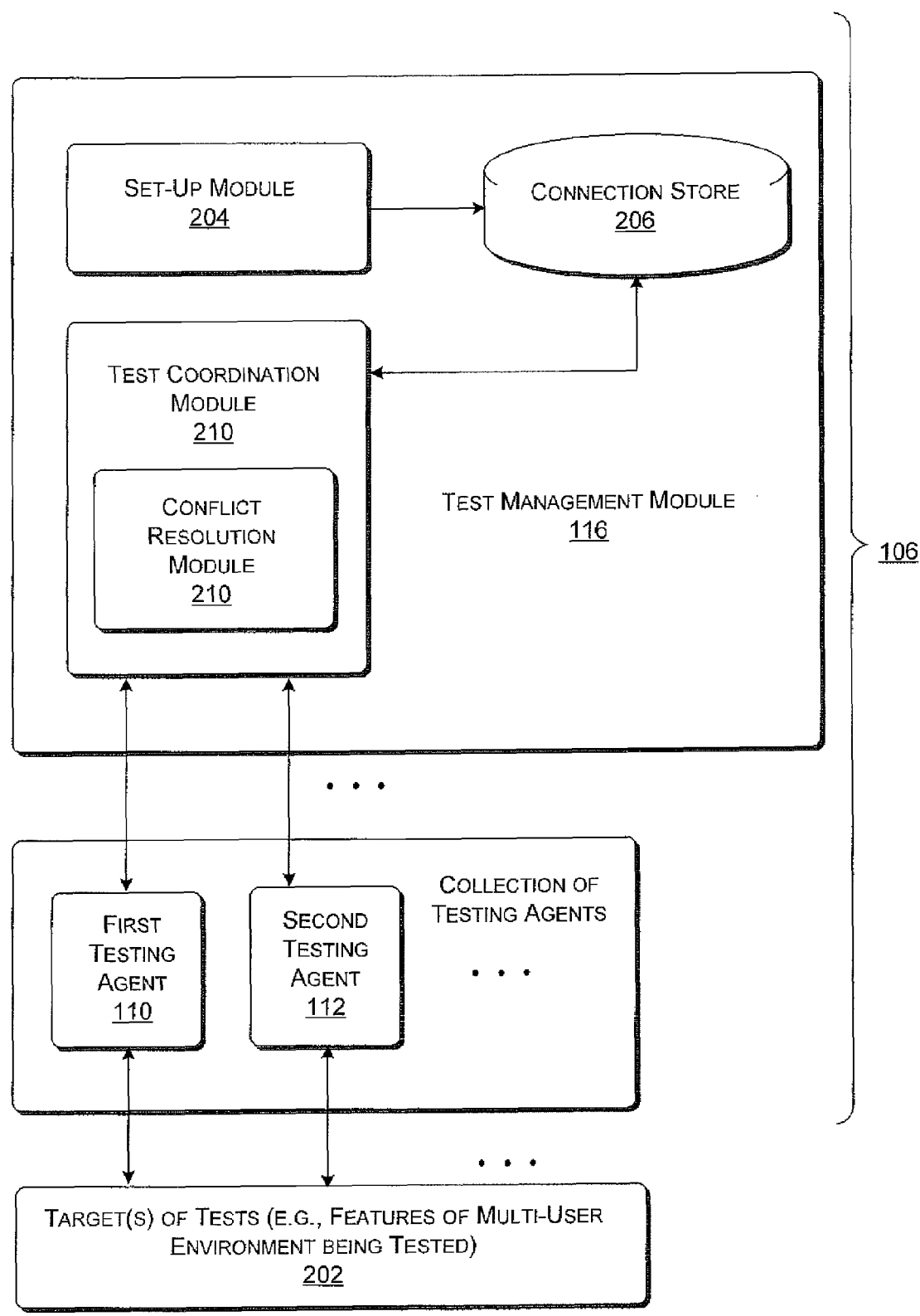
FIG. 2 shows a test framework for use in the system of FIG. 1.

FIG. 2 shows the test framework 106 in greater detail. As identified above, the test framework 106 includes any number of testing agents (e.g., first testing agent 108, second testing agent 112, etc.) and a test management module 116. The purpose of each test executed by the testing agents (108, 112, . . . ) is to test various features of the multi-user environment, such as connection-forming functionality, logon/logoff functionality, redirection functionality, and so forth. FIG. 2 generically shows targets 202 to represent the features of the multi-user environment that are being tested.

The test management module 116 includes a set-up module 204. The purpose of the set-up module 204 is to configure the test framework 106 for the execution of a collection of tests. According to one such set-up operation, the set-up module 204 can create a desired number of connections. The testing agents (108, 112, . . . ) will use these connections to perform their respective tests. However, at this stage, the set-up module 204 does not create the actual physical connections that the testing agents (108, 112, . . . ) will use. Rather, the set-up module 204 creates the abstraction of a defined number of connections in a connection layer. As will be described below, the testing agents (108, 112, . . . ) can invoke these connections by calling a Get method, whereupon the test framework 106 creates the physical connections. The set-up module 204 can store the connections it creates in a connection store 206.

The set-up module 204 can also define in advance (as well as at other stages) various characteristics of the connections. For example the set-up module 204 can include methods which define whether a connection is non-interruptible. A non-interruptible connection is a connection which cannot be interrupted.

The test management module 116 also includes a test coordination module 208. The purpose of the test coordination module 208 is to coordinate the testing agents' (108, 112, . . . ) use of the connections in the connection store 206. For example, assume that the first testing agent 108 wishes to commence its test. The first testing agent 108 can invoke a Get method which constitutes a request for a connection. The test coordination module 208 can determine whether there is a connection available to grant the first testing agent 108. If so, the test coordination module 208 can grant the connection to the first testing agent 108, upon which the first testing agent 108 goes about using this connection to perform its test. The second testing agent 112 can commence its test in the same manner as the first testing agent 108. That is, if another connection is available, the test coordination module 208 can grant this connection to the second testing agent 112, upon which the second testing agent 112 goes about using this connection to perform its test. In this manner, at any time, multiple testing agents can be performing different types of tests in parallel.

When a testing agent is finished with its connection, it can invoke a Release method to release its connection. At this point, the released connection goes back into the pool of available connections for reuse upon request.

While the above-described testing agents can operate in independent fashion without impacting other testing agents, there are certain tests that can potentially interfere with other tests. For example, one or more tests may affect a global state of the multi-user environment. These types of tests can potentially affect other tests which are dependent or otherwise responsive to the global state of the multi-user environment. For example, some tests may require acting on sessions maintained by the server 102 on a system-wide level. Other tests may require starting and stopping certain global services provided by the server 102, and so forth. These types of tests may impact other tests.

To address this issue, the test coordination module 208 includes a conflict resolution module 210. The conflict resolution module 210 generally coordinates the operation of testing agents (108, 112, . . . ) such that one test does not interfere with another test. In one case, for instance, the conflict resolution module 210 can permit a test that affects the global state of the multi-user environment to proceed so long as it does not interfere with any tests currently in progress. The conflict resolution module 210 can thereafter prevent any other tests from proceeding if these tests would be impacted by the ongoing test with global reach.

In one case, the conflict resolution module 210 can play a primary role in deciding whether to grant or deny requests for new tests by testing agents. In other cases, the conflict resolution module 210 can decide to temporarily suspend one or more ongoing tests to avoid a conflict with one or more other ongoing or requested tests.

Other conflict resolution considerations may apply to other types of multi-user environments. In certain cases, priority levels can be assigned to different tests. In this scenario, if a potential conflict arises among two or more tests, the conflict resolution module 210 can allow the test with the highest priority to proceed.

A.3. Exemplary Test Definition System

Figure 3:
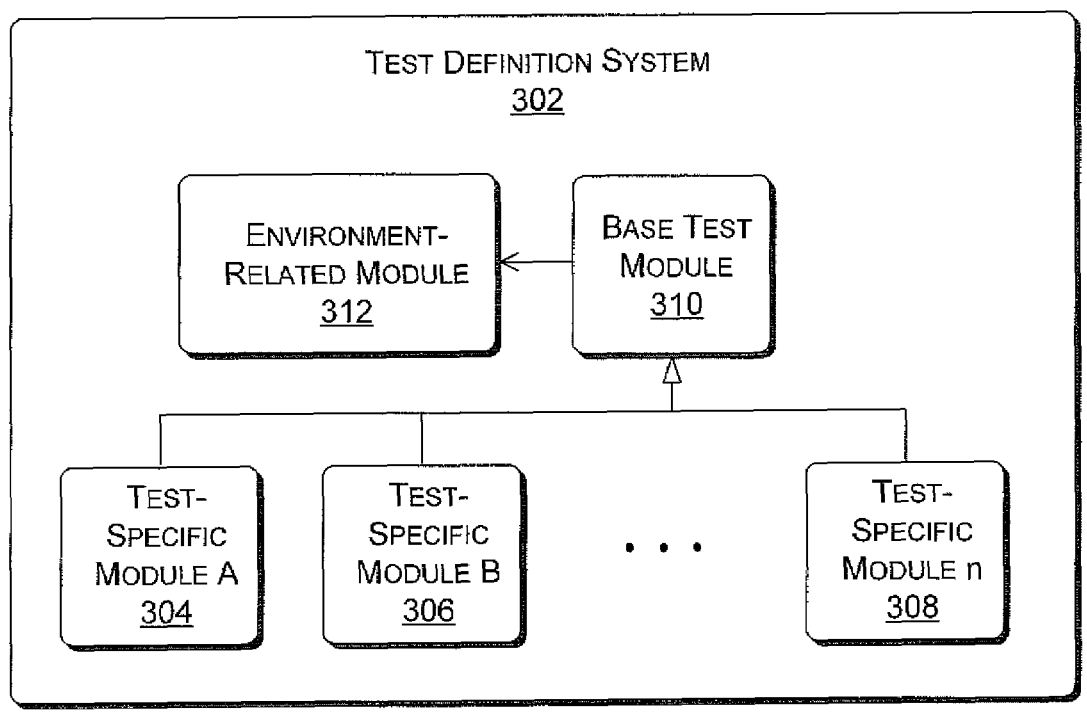
FIG. 3 shows a test definition system for defining tests in the test framework of FIG. 2.

FIG. 3 shows a test definition system 302. The purpose of the test definition system 302 is to provide a framework for adding new tests to the test framework 106. The test definition system 302 also provides a mechanism for instantiating the testing agents (108, 110, . . . ) at the time of execution of the tests.

The test definition system 302 includes a collection of test-specific modules (304, 306, . . . 308). The test-specific modules (304, 306, . . . 308) can include functionality which implements the different tests described above. The test definition system 302 also includes a base test module 310. The base test module 310 includes general functionality which is common to all of the tests. This general functionality is abstracted out of the test-specific modules (304, 306, . . . 308) and placed in base test module 310, which acts as a common parent-type object to the test-specific modules (304, 306, . . . 308). The test definition system 302 also includes an environment-related module 312. The environment-related module 312 includes general configuration information which applies to the execution of the tests. In operation, the testing agents (108, 112, . . . ) carry out their tests based on the combination of information provided in the environment-related module 312, the base test module 310, and the various test-specific modules (304, 306, . . . 308).

As described above, the test management module 116 effectively coordinates the interaction among multiple testing agents (108, 112, . . . ) which implement the tests. The tests, in turn, correspond to the test-specific modules (304, 306, . . . 308). This means that the developers do not have to create code which defines this interaction when creating the test-specific modules (304, 306, . . . 308). In other words, a developer can generally take an agnostic view as to how a test that is being written will interact with other tests. This feature, in turn, simplifies the development and execution of tests.

B. Exemplary Procedures

Figure 4:
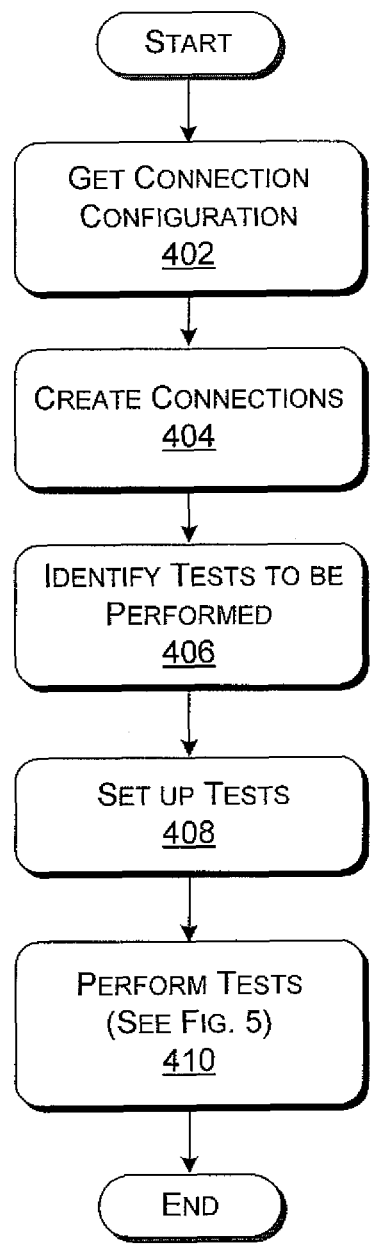
FIGS. 4 and 5 show procedures which explain one exemplary manner of operation of the test framework of FIG. 2.
Figure 5:
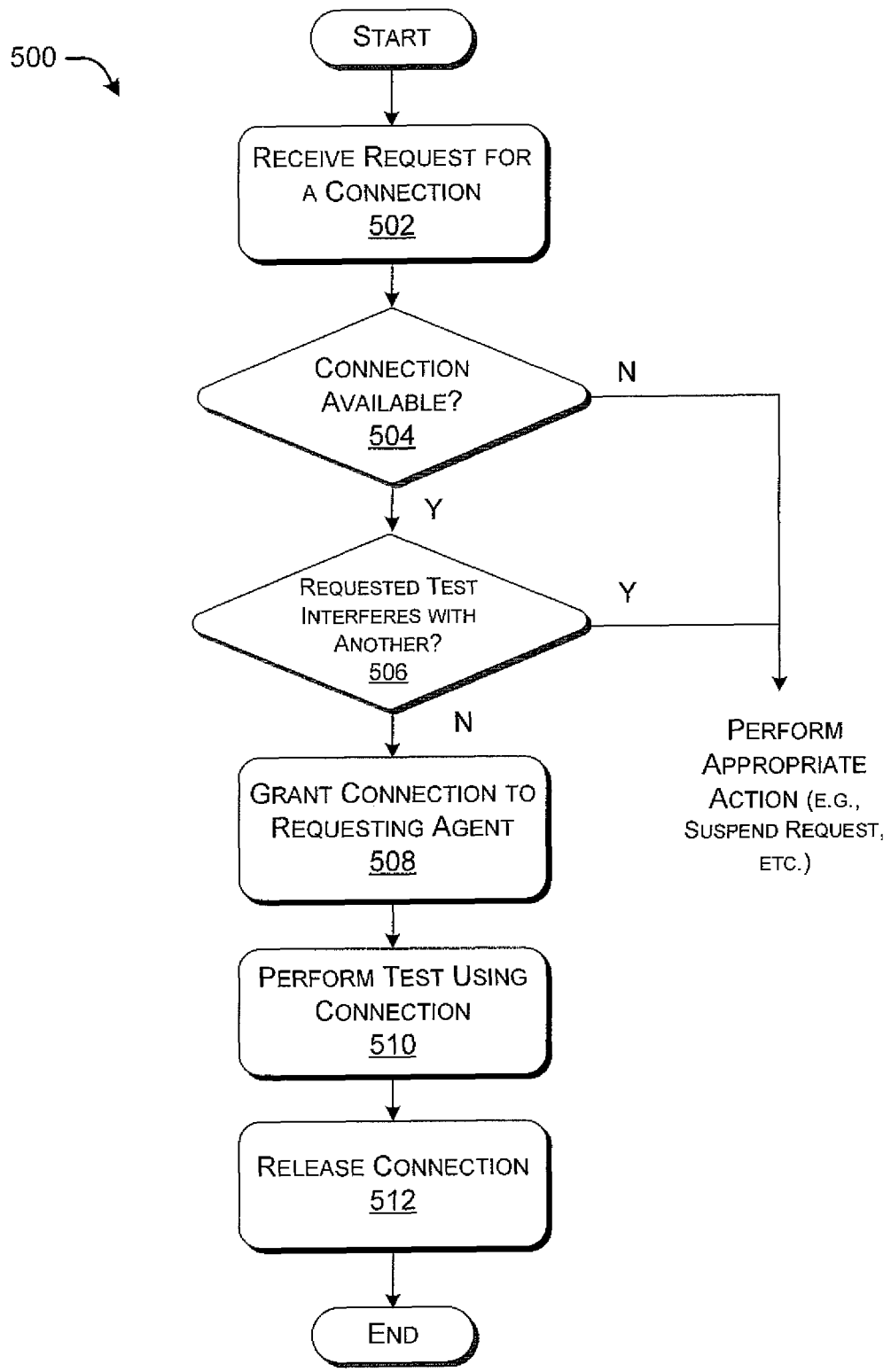

FIGS. 4 and 5 show two procedures which explain the operation of the system 100 in flow chart form. To facilitate discussion, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowchart have already been set forth in Section A, Section B serves principally as a review of those functions.

B.1. System Initialization

FIG. 4 shows a procedure 400 for configuring the test framework 106 for the execution of a collection of tests.

In operation 402, the set-up module 204 can get configuration information which defines the number and types of connections that are required to perform a desired collection of tests.

In operation 404, the set-up module 204 creates the specified connections and stores these connections in the connection store 206. As explained above, the creation of connections at this stage is an abstract construct. The connections are physically created when the tests are later invoked.

In operation 406, the set-up module 204 can identify the collection of tests that should be performed.

In operation 408, the set-up module 206 can instantiate the tests, which has the effect of creating the testing agents (108, 112, . . . ).

In operation 410, the test framework 106 carries out the tests. FIG. 5 provides additional information regarding the execution of the tests.

B.2. Execution of Tests

FIG. 5 shows a procedure 500 for executing one of the tests created in FIG. 4. This same procedure 500 can repeated for other tests. Further, certain aspects of the procedure 500 can be performed in parallel with respect to plural tests.

In operation 502, the test coordination module 208 receives a request from a testing agent which desires to carry out its test. The test will examine one or more features of the multi-user environment. For example, one illustrative test can examine session set-up behavior by repeatedly logging on and logging off the server 102. The testing agent can request a connection by invoking a Get method of the test coordination module 208.

In operation 504, the test coordination module 208 determines whether a connection is available to grant to the requesting testing agent. That is, recall that the test management module 116 includes a predefined number of connections to use in performing testing. If operation 504 results in a negative answer, the procedure 500 can perform any type of connection-denial action. In one case, for instance, the test coordination module 208 can place the request for the test in a queue, such that the request can be repeated at a later time.

In operation 506, the test coordination module 208 determines whether the test being requested by the testing agent will interfere with one or more tests currently being executed (or scheduled to be executed). For instance, a test-in-progress may affect the global state of the multi-user environment, which means that this test will interfere with the test being requested by the testing agent. Alternatively, the test being requested may itself affect the global state, and therefore may interfere with one or more tests-in-progress. If operation 506 results in an affirmative answer, the procedure 500 can perform any type of appropriate action. In one case, for instance, the test coordination module 208 can place the request for the test in a queue, such that the request can be repeated at a later time. In one case, the request is suspended until all non-interruptible connections are addressed; at that time, the request is honored, if possible.

In operation 508, presuming that a connection is available and the requested test will not interfere with another test, the test coordination module 208 grants a connection to the testing agent.

In operation 510, the testing agent performs its test using the granted connection.

In operation 512, at the completion of the test, the testing agent releases its connection, making the connection available for reuse.

Note that the procedure 500 applies various criteria in deciding whether to grant or deny a request for a new test. In other cases, the conflict resolution module 210 can decide to temporarily suspend one or more ongoing tests to avoid a conflict with one or more other ongoing or requested tests.

C. Exemplary Processing Functionality

Figure 6:
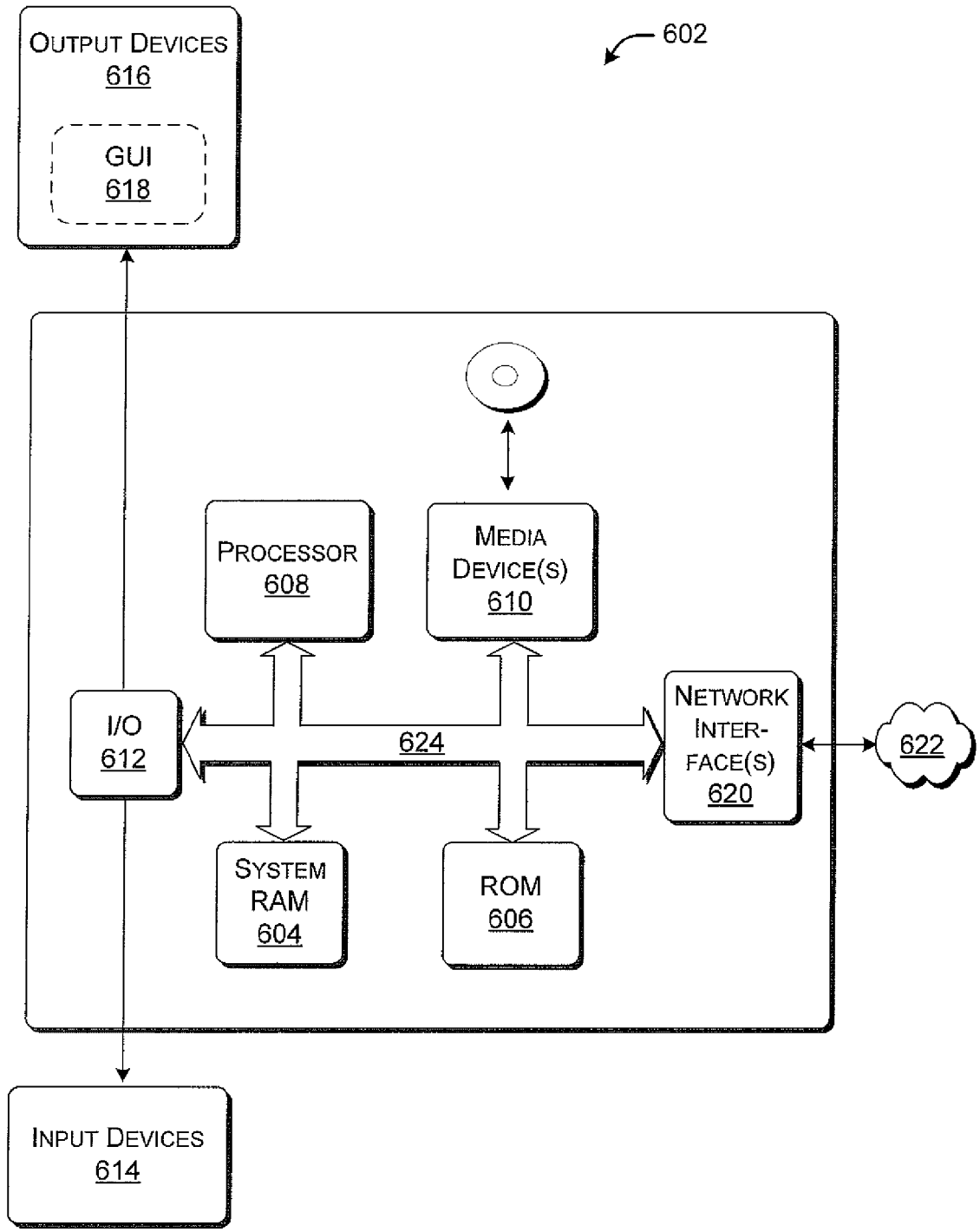
FIG. 6 shows exemplary processing functionality that can be used to implement any aspect of the system of FIG. 1.

FIG. 6 sets forth exemplary processing functionality 602 that can be used to implement any aspect of system 100 shown in FIG. 1. In one non-limiting case, for instance, the processing functionality 602 may represent any computer machine used by the system 100, e.g., to implement any aspect of the server 102, any aspect of a client, any aspect of separate testing functionality, and so forth.

The processing functionality 602 can include various volatile and non-volatile memory, such as RAM 604 and ROM 606, as well as one or more central processing units (CPUs) 608. The processing functionality 602 can perform various operations identified above when the CPU 608 executes instructions that are maintained by memory (e.g., 604, 606, or elsewhere). The processing functionality 602 also optionally includes various media devices 610, such as a hard disk module, an optical disk module, and so forth.

The processing functionality 602 also includes an input/output module 612 for receiving various inputs from the user (via input devices 614), and for providing various outputs to the user (via output devices 616). One particular output device may include a display apparatus and an associated graphical user interface (GUI) 618. The processing functionality 602 can also include one or more network interfaces 620 for exchanging data with other devices via one or more communication conduits 622. One or more communication buses 624 communicatively couple the above-described components together.

The communication conduits 622 can be implemented in different ways to suit different technical and commercial environments. For instance, the communication conduits 622 can include any kind of network (or combination of networks), such as a wide area network (e.g., the Internet), an intranet, Digital Subscriber Line (DSL) network infrastructure, point-to-point coupling infrastructure, and so on. In the case where one or more digital networks are used to exchange information, the communication conduits 622 can include various hardwired and/or wireless links, routers, gateways, name servers, and so on. The communication conduits 622 can be governed by any protocol or combination of protocols. (In the context of FIG. 1, the communication conduits 622 may represent the networks 112.)

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computerized test framework for performing testing in a multi-user environment, comprising:
   one or more computing device;
   a plurality of testing agents executing on the one or more computing devices and configured to perform a respective plurality of tests, each test of the plurality of tests to determine a reliability of one or more features of the multi-user environment, the plurality of tests including a test to identify one or more race conditions in the multi-user environment, the plurality of testing agents including at least a first testing agent and a second testing agent; and a test management module executing on the one or more computing devices, the test management module to:
receive a first request from the first testing agent to perform a first test;
in response to determining that a first connection is available, providing the first connection to the first testing agent to enable the first testing agent to perform the first test;
receive a second request from a second testing agent to perform a second test of the multi-user environment;
in response to determining that a second connection is available, determine whether the first test depends on a global service provided in the multi-user environment;
in response to determining that the first test depends on the global service, determine whether the second test affects execution of the global service;
in response to determining that the second test affects execution of the global service, determine that the second test interferes with the first test;
in response to determining that the second test interferes with the first test, deny the request; and
in response to determining that the second test does not interfere with the first test, provide the second connection to the second testing agent.

2. The computerized test framework of claim 1, wherein the test management module includes a conflict resolution module which is configured to prevent interference among the plurality of tests performed by the plurality of testing agents.

3. The computerized framework of claim 1, wherein the test management module is configured to manage a group of connections for use by the plurality of testing agents in conducting the plurality of tests, the group of connections including the first connection and the second connection.

4. The computerized framework of claim 3, wherein, before receiving the first request, the test management module is configured to create the group of connections.

5. The computerized framework of claim 1, wherein both the plurality of testing agents and the test management module execute on a same computing device of the one or more computing devices.

6. The computerized framework of claim 1, wherein:
the one or more computing devices include a first computing device and a second computing device;
the plurality of testing agents are executed by the first computing device; and
the test management module is executed by the second computing device.

7. A computerized method, executed by one or more computing devices, for performing testing in a multi-user environment, comprising:
executing a plurality of testing agents executing on the one or more computing devices, wherein the testing agents when executed are configured to perform a respective plurality of tests, each test of the plurality of tests to determine a reliability of one or more features of the multi-user environment;

executing a test management module executing on the one or more computing devices, the test management module, when executed, to perform:
receiving, by at least one of the one or more computing devices, a first request from a first testing agent of the plurality of testing agents to conduct a first test of the multi-user environment, the first test including a race condition test to identify one or more race conditions in the multi-user environment;
in response to determining that a first connection is available, granting the first request and providing the first connection to the first testing agent to enable the first testing agent to perform the first test;
receiving a second request from a second testing agent of the plurality of testing agents to perform a second test of the multi-user environment;
in response to determining that a second connection is available, determining whether the second test interferes with the first test based at least partly on determining whether the first test depends on a global state of the multi-user environment and whether the second test affects the global state;
in response to determining that the second test interferes with the first test, denying the second request; and
in response to determining that the second test does not interfere with the first test, granting the second request to perform the second test of the multi-user environment and providing the second connection to the second testing agent.

8. The computerized method of claim 7, wherein the first test uses device redirection in which the first testing agent executes on a first computing device while utilizing one or more testing tools implemented on a second computing device.

9. The computerized method of claim 7, further comprising, in advance of receiving the first request, defining a number of available connections.

10. The computerized method of claim 7, wherein the multi-user environment is a remote-operating environment in which a plurality of clients interact with one or more applications executed on a remote server.

11. The computerized method of claim 7, wherein the second test determines a reliability of at least one feature of the multi-user environment.

12. The computerized method of claim 7, further comprising creating the first test based on configuration information provided by a base test module and a test-specific module, wherein a base portion of the configuration information provided by the base test module applies to a plurality of tests and a test-specific portion of the configuration information provided by the test-specific module applies only to the first test.

13. The computerized method of claim 12, wherein the first test is further created based on environmental configuration information provided by an environment-related module.

14. The computerized method of claim 7, further comprising:
receiving, from a third agent, a third request to perform a third test;
receiving, from a fourth agent, a fourth request to perform a fourth test;
granting the fourth request in response to determining that the fourth test has a priority level that is greater than the third test; and
denying the fourth request in response to determining that the fourth test has a priority level that is less than or equal to the third test.

15. The computerized method of claim 14, further comprising:
after granting the fourth request to perform the fourth test, temporarily suspending the third test.

16. One or more memory devices to store instructions executable by one or more processors to perform acts comprising:
a test management module executing on the one or more processors to perform acts comprising:
receiving a request from a first testing agent to perform a first test of a multi-user environment, wherein a plurality of testing agents executing on the one or more processors include at least the first testing agent and a second testing agent, the plurality of testing agents configured to perform a respective plurality of tests, each test of the plurality of tests to determine a reliability of one or more features of the multi-user environment;
in response to determining that a first connection is available, providing the first connection to the first testing agent to enable the first testing agent to perform the first test, the first test including a stress test to repeatedly perform an action invoking a feature of the multi-user environment to identify one or more race conditions in the multi-user environment;
receiving a second request by the second testing agent to perform a second test of the multi-user environment;
in response to determining that a second connection is available, determining whether the second test interferes with the first test;
in response to determining that the second test interferes with the first test based at least partly on determining that the first test depends on a global service of the multi-user environment and the second test affects execution of the global service, denying the second request; and
in response to determining that the second test does not interfere with the first test, granting the second request to perform the second test and providing the second connection to the second testing agent.

17. The one or more memory devices of claim 16, the acts further comprising:
denying the second request in response to determining that the second connection is unavailable.

18. The one or more memory devices of claim 16, the acts further comprising:
coordinating usage of a group of connections used to conduct one or more tests in the multi-user environment, the group of connections for use by a plurality of testing agents that include the first testing agent and the second agent, the group of connections including the first connection and the second connection.

19. The one or more memory devices of claim 16, the acts further comprising:
in response to determining that the second test has a higher priority level than the first test, temporarily suspending the first test and granting the second request to perform the second test.

20. The one or more memory devices of claim 16, the acts further comprising:
granting the second request at least partly in response to determining that a first priority level associated with the first test is less than a second priority level associated with the second test; and
denying the second request at least partly in response to determining that the first priority level is greater than or equal to the second priority level.

* * * * *